United States Patent

[11] 3,617,617

[72] Inventor Morton Katz
Columbus, Ohio

[21] Appl. No. 45,699
[22] Filed June 12, 1970
[45] Patented Nov. 2, 1971

[73] Assignee E. I. du Pont de Nemours and Company
Wilmington, Del.

[54] INSULATED ELECTRICAL CONDUCTOR
7 Claims, 7 Drawing Figs.

[52] U.S. Cl. .......... 174/120
[51] Int. Cl. .......... H01 7/02, H01 3/30
[50] Field of Search .......... 174/120, 120.4, 110, 110.43; 156/53

[56] References Cited

UNITED STATES PATENTS

| | | | |
|---|---|---|---|
| 3,422,215 | 1/1969 | Humes | 174/120 |
| 3,425,865 | 2/1969 | Shelton, Jr. | 174/120 X |
| 3,408,453 | 10/1968 | Shelton, Jr. | 174/120 X |

*Primary Examiner*—Lewis H. Myers
*Assistant Examiner*—A. T. Grimley
*Attorney*—Claude L. Beaudoin

ABSTRACT: Insulated electrical conductors are provided wherein a silver conductor is wrapped with an insulation covering of polyimide polymeric material and a sulfur-containing polyimide polymeric material that is disposed between the silver conductor and the polyimide polymeric material.

PATENTED NOV 2 1971 3,617,617

INVENTOR
MORTON KATZ

BY Claude L. Beaudoin
ATTORNEY

INSULATED ELECTRICAL CONDUCTOR

THE INVENTION

The present invention relates to articles of manufacture comprising insulated electrical conductors. More particularly, the present invention is directed to silver conductors insulated with polyimide polymeric material.

Electrical conductors insulated with polyimide polymeric material are known articles of manufacture. For instance, military specification MIL-W-81381(AS) sets forth specifications for certain types of polyimide-insulated electrical conductors. A serious drawback of such conductors has been discovered in that the polyimide insulation degrades when used in combination with silver conductors at elevated temperatures. Accordingly, it is the principal object of the present invention to overcome the aforementioned problem by providing polyimide-insulated electrical conductors of silver which will be suitable for extended use, especially at high temperatures.

According to the present invention, there is provided an insulated electrical conductor comprising a conductor of silver having an insulation covering of a layer of polyimide polymeric material and a layer of a sulfur-containing polyimide polymeric material disposed intermediate said conductor and said polyimide layer. In a preferred embodiment, the sulfur-containing polyimide layer is at least about 0.001 mil thick and is based in whole or in part on sulfur-bearing components. Additionally, the insulated electrical conductors of the present invention may include one or more layers of a heat-sealable fluorocarbon polymer.

The nature and advantages of the laminar structure of the present invention will be more clearly understood by the following description thereof and the several views illustrated in the accompanying drawing wherein like reference characters refer to the same parts throughout the several views and in which.

Figure 7:
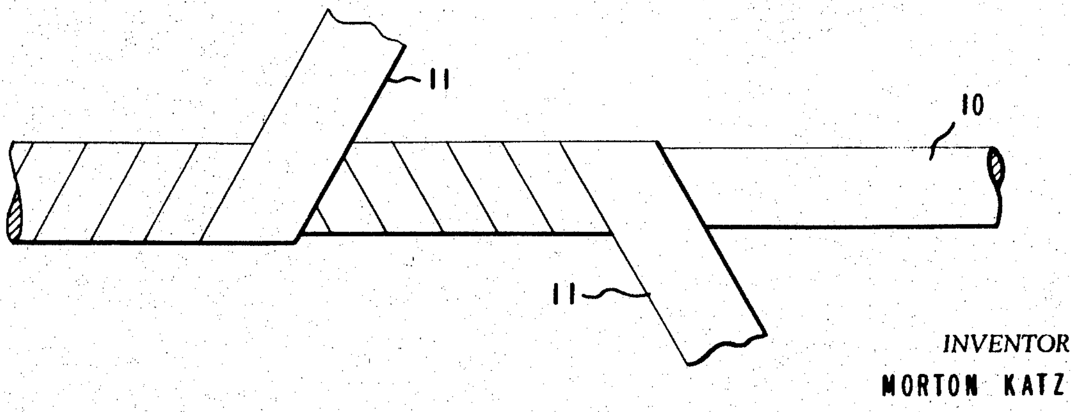
FIG. 7 is a schematic view showing the construction of one embodiment of the insulated electrical conductor of the present invention.

The insulated electrical conductor herein disclosed in illustration of the invention is depicted in FIG. 7 which shows a silver conductor 10 which is overwrapped with an insulation covering 11. The silver conductor may be of any desired construction and is shown in FIG. 7 in wire form. Additionally, the silver conductor may be entirely of silver or a silver alloy or simply any suitable electrical conductor having a coating of silver. The insulation covering 11 may be provided in any of several desirable embodiments as shown, for example, in any one of FIGS. 1 through 6.

In each of FIGS. 1 through 6, reference numeral 12 depicts a layer of polyimide polymeric material, and reference numeral 13 depicts a sulfur-containing polyimide polymeric material. Additionally, reference numeral 14 depicts a layer of a heat-sealable fluorocarbon polymeric material.

As shown in each of FIGS. 1-6, the base layer 12 of the insulation covering of the conductor of the invention is a polyimide or copolyimide characterized by the following recurring structural unit:

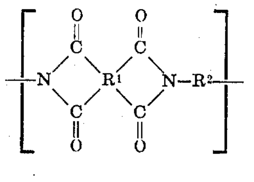

(1)

wherein $R^1$ is an organic tetravalent radical containing at least two carbon atoms, no more than two carbonyl groups of said recurring unit being attached to any one carbon atom of said tetravalent radical; and $R^2$ is a divalent radical containing at least two carbon atoms, the nitrogen atoms of adjacent polyimide units being attached to a separate carbon atom of said divalent radical.

More specifically, $R^1$ is a tetravalent aliphatic, cycloaliphatic, aromatic or heterocyclic organic radical, or combination thereof. Preferably, $R^1$ is a tetravalent aromatic radical and the four carbonyl groups are attached directly in two pairs to separate carbon atoms in an aromatic ring, and each pair of carbonyl groups is attached to adjacent (i.e. ortho or peri) carbon atoms in a ring of the $R^1$ radical. Preferably, $R^1$ contains at least one ring of six carbon atoms characterized by benzenoid unsaturation. Representative preferred tetravalent aromatic organic $R^1$ radicals include the following and substituted derivatives thereof:

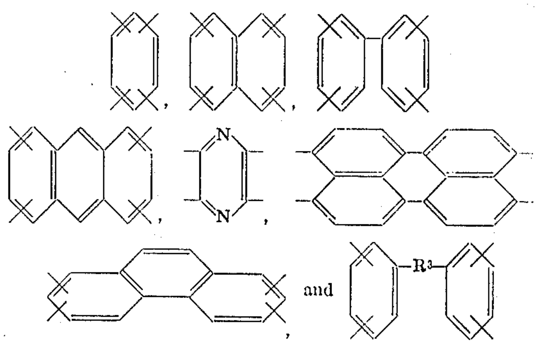

where $R^3$ is alkylene of one to three carbon atoms, oxygen, or one of the following:

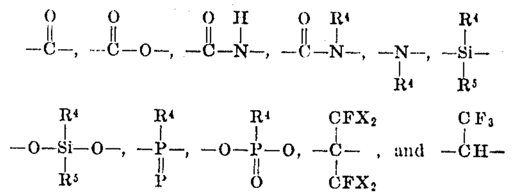

wherein $R^4$ and $R^5$ are alkyl or aryl, and substituted groups thereof, and each X is separately chosen from the group consisting of F and Cl, the said $R^1$ being such as obtained from a dianhydride of the formula

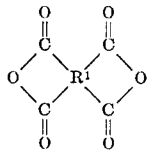

where $R^1$ has the same meaning as above.

In those $R^1$ radicals above having free valencies shown in indefinite positions, the free valencies are so disposed that there are two pairs of valencies, each pair being either ortho or peri.

More specifically, $R^2$ is a divalent aliphatic, cycloaliphatic, aromatic or heterocyclic organic radical, or combination thereof. Preferably, $R^2$ is a divalent aromatic (arylene) radical, the nitrogen atoms being attached to carbon atoms in a ring of the $R^2$ radical. Representative preferred $R^2$ arylene radicals include the following and substituted derivatives thereof: phenylene, naphthylene, biphenylene, anthrylene, furylene, benzfurylene, and

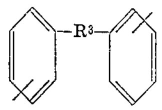

wherein $R^3$ is as defined above. The $R^2$ groups are conveniently derived from organic diamines having the formula $H_2N\text{-}R^2\text{-}NH_2$ where $R^2$ is as defined above.

Suitable polyimides for layer 12 of the insulation covering of the conductor of the present invention include such as are derived from the following dianhydrides:

pyromellitic dianyhydride
benzene-1,2,3,4-tetracarboxylic dianhydride
2,2''-diphenyltetracarboxylic dianhydride
3,3'-4,4'-diphenyltetracarboxylic dianhydride
bis (2,3-dicarboxyphenyl)methane dianhydride
bis(3,4-dicarboxyphenyl)methane dianhydride
1,1-bis(2,3-dicarboxyphenyl)ethane dianhydride
1,1-bis(3,4-dicarboxyphenyl)ethane dianhydride
2,2-bis(2,3-dicarboxyphenyl)propane dianhydride
2,2-bis(3,4-dicarboxyphenyl)propane dianhydride
2,2-bis(3,4-dicarboxyphenyl)-1,1,1-trifluoroethane dianhydride
2,2-bis(3,4-dicarboxyphenyl)hexafluoropropane dianhydride
2,2-bis(3,4-dicarboxyphenyl)-1-chloro-1,1,3,3,3-pentafluoropropane dianhydride
2,2-bis(3,4-dicarboxyphenyl)-1,3-dichloro-1,1,3,3-tetrafluoropropane dianhydride
2,2-bis(3,4-dicarboxyphenyl)-1,1,3,3-tetrachloro-1,3-difluoropropane dianhydride
bis(3,4-dicarboxyphenyl) ether dianhydride
2,3,2',3'-benzophenonetetracarboxylic dianhydride
3,4,3',4'-benzophenonetetracarboxylic dianhydride
benzoylpyromellitic dianhydride
6-(3',4'-dicarboxybenzoyl)-2,3-naphthalene dicarboxylic dianhydride
4'-(3'',4''-dicarboxybenzoyl)-3,4-diphenyl dicarboxylic dianhydride
4-(3',4'-dicarboxybenzoyloxy)phthalic dianhydride
4-(3',4'-diacarboxybenzamido)phthalic dianhydride
3,4,3',4'-azobenzenetetracarboxylic dianhydride
naphthalene-2,3,6,7-tetracarboxylic dianhydride
naphthalene-1,4,5,8-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-9c 1,8,9,10-tetracarboxylic dianhydride
3,4,9,10-perylenetetracarboxylic dianhydride
pyrazine-2,3,5,6-tetracarboxylic dianhydride
ethane-1,1,2,2-tetracarboxylic dianhydride;
butane-1,2,3,4-tetracarboxylic dianhydride
cyclobutane-1,2,3,4-tetracarboxylic dianhydride
dimethylcyclobutane-1,2,3,4-tetracarboxylic dianhydride
tetramethylcyclobutane-1,2,3,4-tetracarboxylic dianhydride
cyclopetane-1,2,3,4-tetracarboxylic dianhydride
cyclohexane-1,2,4,5-tetracarboxylic dianhydride
decahydronaphthalene-1,4,5,8-tetracarboxylic dianhydride
tricyclo [4,2,2,$0^{2,5}$]dec-7-ene-3,4,9,10-tetracarboxylic dianhydride
position isomers of the above, etc., and mixtures thereof.

Suitable polyimides for layer 12 of the insulation covering of the conductor of the present invention also include such as are derived from the following diamines:

meta-phenylenediamine
para-phenylenediamine
benzidine
3,3'-dimethyl-4,4'-diaminobiphenyl
3,3'-dichlorobenzidine
3,3'-dimethoxybenzidine
4,4'-diaminodiphenylmethane
1,1-bis(4-aminophenyl)ethane
2,2-bis(4-aminophenyl)propane
2,2-bis(4-aminophenyl)hexafluoropropane
2,2-bis(4-aminophenyl)-1,3-dichloro-1,1,3,3-tetrafluoropropane
4,4'-diaminodiphenyl ether
2,2'-diaminobenzophenone
3,3'-diaminobenzophenone
4,4'-diaminobenzophenone
3,4'-diaminobenzophenone
N,N-bis(4-aminophenyl)aniline
N,N-bis(4-aminophenyl)methylamine
N,N-bis(4-aminophenyl)-n-butylamine
m-aminobenzoyl-p-aminoanilide
4-aminophenyl 3-aminobenzoate
4,4'-diaminoazobenzene
3,3'-diaminoazobenzene
bis(3-aminophenyl)diethyl silane
bis(4-aminophenyl)phenyl phosphine oxide
bis-(4-aminophenyl)ethyl phosphine oxide
1,5-diaminonaphthalene
2,6-diaminopyridine
2,5-diamino-1,3,4-oxadiazole
m-xylylenediamine
p-xylylenediamine
2,4-bis(beta-amino-t-butyl)toluene
bis(p-beta-amino-t-butylphenyl)ether
p-bis(2-methyl-4-aminopentyl)benzene
p-bis(1,1-dimethyl-5-aminopentyl)benzene
hexamethylenediamine
heptamethylenediamine
octamethylenediamine
nonamethylenediamine
decamethylenediamine
1,11-undecanediamine
1,12-dodecanediamine
1,13-tridecanediamine
1,14-tetradecanediamine
1,16-hexadecanediamine
1,18-octadecanediamine
2,11-diaminododecane
1,12-diaminooctadecane
2,17-diaminoeicosadecane
2,2-dimethylpropylenediamine
3,3-dimethylpentamethylenediamine
2,5-dimethylhexamethylenediamine
3-methylhexamethylenediamine
1,1,6,6-tetramethylhexamethylenediamine
2,2,5,5-tetramethylhexamethylenediamine
3-methylheptamethylenediamine
2,5-dimethylheptamethylenediamine
4,4-dimethylheptamethylenediamine
5-methynonamethylenediamine
1,4-diaminocyclohexane
bis(para-aminocyclohexyl)methane
3-methoxyhexamethylenediamine
1,2-bis-(3-aminopropoxy)ethane
N,N-bis(3-aminopropyl)methylamine
position isomers of the above, etc., and mixtures thereof.

In those cases where the base layer 12 of the insulation covering incorporates aliphatic moieties, such as alkylene radicals in the aliphatic diamines, the base layer can be crosslinked as by means of electron irradiation.

The layer(s) 13 of the insulation covering of the conductor of the present invention is a polyimide or copolyimide characterized by the following recurring structural unit:

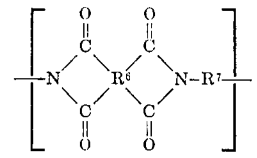

(3)

Wherein $R^6$ is a tetravalent radical selected from the group consisting of $R^1$ and $R^8$, wherein $R^8$ is selected from the group consisting of

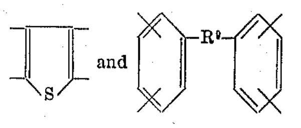

where $R^9$ is

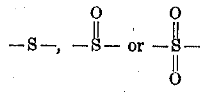

and $R^7$ is a divalent radical selected from the group consisting of $R^2$ and $R^{10}$, wherein $R^{10}$ is selected from the group consisting of

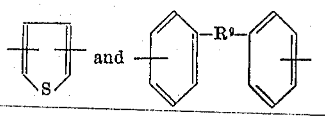

where $R^9$ is as defined above; provided that the sum of the moles of $R^8$ and $R^{10}$ radicals is at least about 25%, preferably at least 50%, of the sum of the moles of $R^6$ and $R^7$ radicals.

Suitable polyimides for layer(s) 13 of the insulation covering of the conductor of the present invention include such as are derived from dianhydrides listed above and from the following dianhydrides and mixtures thereof:

bis(3,4-dicarboxyphenyl) sulfide dianhydride
bis(3,4-dicarboxyphenyl) sulfone dianhydride
bis(3,4-dicarboxyphenyl) sulfoxide dianhydride
thiophene-2,3,4,5-tetracarboxylic dianhydride Suitable polyimides for layer(s) 13 of the insulation covering of the conductor of the present invention include such as are derived from diamines listed above and from the following diamines:

4,4'-diaminodiphenyl sulfide
3,3'-diaminodiphenyl sulfide
4,4'-diaminodiphenyl sulfoxide
4,4'-diaminodiphenyl sulfone
3,3'-diaminodiphenyl sulfone
2,4-thiophenediamine
bis(3-aminopropyl) sulfide It is also possible to use as components of the polyimide employed in layer(s) 13 those based on dianhydrides and diamines which are substituted with sulfur-bearing groups such as organo mercapto, organo sulfonyl, and organo sulfinyl groups.

It is also possible to use in place of the polyimide of layer(s) 13 a polymer known in the art as a polyamide/imide, that is, a polymer containing both intralinear amide and imide linkages, if it contains sulfur. One type of such copolymer is described in U.S. Pat. No. 3,179,635, for example, a polymer derived from bis(3,4-dicarboxyphenyl) sulfone dianhydride and an aromatic diamine containing a multiplicity of intralinear amide linkages. Another type of such copolymer is described in British Pat. No. 1,032,649, British Pat. No. 1,056,564 and U.S. Pat. No. 3,260,691, for example, a polymer derived from trimellitic anhydride acid chloride and diaminodiphenyl sulfone.

The polyimides, their polyamide-acid precursors and preparation of both are now well known in the art and are described, for example, in U.S. Pat. No. 3,179,614 and U.S. Pat. No. 3,179,634. The thickness of the base polyimide layer 12 is between about 0.25 mil and about 10 mils, preferably between 0.5 mil and 2.0 mils. The thickness of each polyimide layer 13 is between about 0.001 mil and about 1 mil or more, preferably 0.05 to 0.5 mil.

The layer 14 of the insulation covering of the conductor of the present invention is a fluorocarbon polymeric material. The expressions "fluorocarbon polymer" and "fluorocarbon polymeric material" as used herein means polytetrafluoroethylene (TFE) and copolymers of tetrafluoroethylene and hexafluoropropylene (FEP). The fluorocarbon polymers are extensively described in such patents as U.S. Pat. Nos. 2,833,686; 2,946,763 and 3,051,683. The layer of fluorocarbon polymer is preferably a copolymer of between about 50 percent by weight and about 95 percent by weight tetrafluoroethylene and between about 5 percent by weight and about 50 percent by weight of hexafluoropropylene, especially wherein the amount of hexafluoropropylene is between about 7 percent by weight and about 27 percent by weight. All percentages are by weight based upon the total copolymer weight. Optionally, the fluorocarbon copolymer may be blended with up to 95 percent by weight (of the total weight of the two polymers) of a homopolymer of tetrafluoroethylene. The thickness of the fluorocarbon polymer layer is preferably between about 0.25 mil and about 10 mils.

The insulation covering 11 of the conductor of the present invention may be fabricated by any convenient method.

The layer 14 of the insulation covering of the conductor of the present invention is a fluorocarbon polymer as described by Kreuz and Zytkus, page 14, line 16 to page 15, line 8, U.S. Ser. No. 858,494, filed Sept. 16, 1969.

In manufacturing the laminar structures of this invention, the first operation is generally to combine layer 12 with layer(s) 13. This can be done in several ways.

In one method, a solution of the polyamide-acid corresponding to the polyimide of layer(s) 13 is applied to one or both sides, as desired, of a film of the base polyimide layer 12, and is passed through an oven or series of ovens to dry the coating and imidize the polyamide-acid to the desired polyimide. Solutions of polyamide-acids in appropriate solvents suitable for use in coating are described in U.S. Pat. No. 3,179,614. Other polyimide precursors such as polyamide-esters (described in U.S. Pat. No. 3,312,663), mixtures of tetracarboxylic diacid diesters and diamines (described in U.S. Pat. No. 3,347,808), and other precursors known in the art, in solution in appropriate solvents, may be used for coating in place of the polyamide-acid, followed by heating to dry and imidize the precursor to polyimide. In those cases where the polyimide itself is soluble in a solvent, it can clearly also be applied in such form rather than in the form of its precursor, and dried. It is also possible to coat the base layer 12 with an amine salt of the polyamide-acid corresponding to the polyimide of layer(s) 13, dissolved in a medium which wholly or partly consists of water, followed by heating to dry it and convert this precursor to the polyimide of layer(s) 13.

Another method is to laminate together preformed self-supporting polyimide films of layers 12 and 13. This is possible when each layer has a thickness of about 0.25 mil or more, preferably 0.5 mil or more. Satisfactory bonds between the two layers can be obtained by laminating at pressures and temperatures close to or above the fusion point of one of the layers in those cases where one of them is fusible, or by using primers or adhesion promoters such as known silanes, titanates, polyethyleneimine, and so forth.

Figures 1, 2:
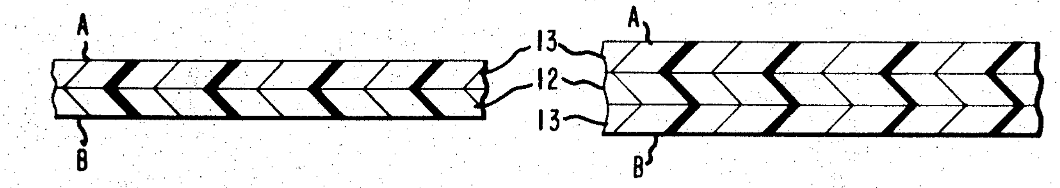
FIG. 1 is a schematic view showing an insulation covering of two layers.
FIGS. 2 and 3 are schematic views showing insulation coverings of three layers.

When it is desired to have an insulation covering incorporating a fluorocarbon polymer layer, the next step in manufacturing is generally to combine the performed structure of FIGS. 1 or 2 with one or more layer(s) 14. This can easily be done in several ways.

In one method, one or two layers of a perfluorocarbon polymer film as described above are laminated with the structures of FIGS. 1 or 2 under the action of heat sides pressure. That surface of each fluorocarbon polymer film which is to be bonded to the structure of FIG. 1 or 2 must first be treated such as, for example, by electrical discharge in the presence of an organic vapor such as glycidyl methacrylate, as described in U.S. Pat. No. 3,296,011. It is preferred that both sides of each fluorocarbon polymer film be so treated, so that not only will the resulting laminar structure be well bonded, but also it will bond well to itself, and to other insulation materials which it will contact in use, when heat sealed. The lamination under heat and pressure may be done in any manner desired, such as described in U.S. Pat. No. 3,455,774. When it is desired that the exposed side of the fluorocarbon polymer layer be electrical discharge treated as described above, the treatment of such surface may be done after the laminating operation, if desired, as well as before it.

The laminar structures of FIGS. 3 through 6 will readily form heat seals, side A to side B. The laminar structure of FIG. 2 will heat seal to itself if the polyimide of layers 13 is a fusible polyimide and at least about 0.1 mil thick. The laminar structure of FIG. 1 will not readily heat seal to itself under heat-sealing conditions normally used in the art, side A to side B, even if the polyimide of layer 13 is fusible. Accordingly, when it is desired to have laminar structures of the types of FIGS. 1 and 2 which are heat sealable, side A to side B, it is preferred to prime one or both sides of the structure with an adhesion promoter of known type such as polyethyleneimine, a silane, a titanate, and so forth.

The insulation coverings above described are normally used by slitting sheet structures thereof into narrow tapes, usually about one-eighth to one-half inch wide, and the tapes are spirally wound onto metal wires. A tape is wound overlapped on itself, usually with a 50 to 67 percent overlap, so as to build up two or three layers of insulation in one wrapping. Most often, multiple wraps are applied, employing the same or different laminar tapes. For example, a tape often used for second and third wraps has a base polyimide layer and layers of fluorocarbon polymer on both sides of the base layer. Each succeeding wrap is generally contralapped over the previous wrap, that is, it is spirally wound in the opposite direction or "-hand" compared to the previous wrap. The insulated wire construction is then heat sealed by passing it through an oven or series of ovens at a temperature sufficiently high to fuse the fluorocarbon polymer layers and/or the fusible polyimide layers. If there are numerous wraps of insulation, it is possible to heat seal in stages, that is, apply some wraps of tape, heat seal, then apply additional wraps of tape and heat seal again.

The insulation coverings described hereinabove are especially adapted for use as insulation on silver or silver-coated wires, particularly when high temperatures will be encountered. By comparing insulated silver wire constructions incorporating as the first wrap of insulation a tape of one of the insulation coverings described above against wire constructions having as the first wrap of insulation a tape which does not include a polyimide layer 13, by aging at temperatures of 250° C. for extended periods of time, it has been found that, whereas the latter was highly degraded and no longer functionally useful within 20 days, the former remained functional and essentially intact for periods in excess of 60 days when as little as 0.05 mil of the polyimide layer 13 was present. In similar tests at 300° C., while the latter wire was no longer functional in 8 days, the former was still functional and essentially intact for more than 18 days.

The principle and practice of the present invention will now be illustrated by the following examples which are only exemplary thereof and it is not intended that the invention be limited thereto since modifications in technique and operation will be apparent to anyone skilled in the art.

The polymeric materials described in the examples herein were evaluated in accordance with the following procedure:

INHERENT VISCOSITY

The inherent viscosity of the polymeric material was measured at 30° C. at a concentration of 0.5 percent by weight of the indicated polymer in dimethylacetamide (DMAC). To calculate inherent viscosity, the viscosity of the polymer solution is measured relative to that of the DMAC alone.

$$\text{Inherent viscosity} = \frac{\text{Natural logarithm}\ \dfrac{\text{Viscosity of polymer solution}}{\text{Viscosity of DMAC}}}{C}$$

where C is the concentration expressed in grams of polymer per 100 milliliters of solution.

The following examples will serve to illustrate the invention.

EXAMPLE 1

Three polyamide-acid coating lacquers were prepared for coatings on a base polyimide film, as follows:

Coating lacquer A was prepared from 328.0 g. (1.02 mole) of benzophenone-3,3',4,4'-tetracarboxylic dianhydride, 200 g. (1 mole) of 4,4'-diaminodiphenyl ether, and 2,770 g. of N, N-dimethylacetamide (DMAC), by adding the dianhydride slowly to a stirred solution of the diamine in the DMAC under nitrogen. The resulting polyamide-acid had an inherent viscosity of 1.11. To 704 g. of the above polyamide-acid solution was added 412 g. of DMAC, to give a 9.2 percent solids coating lacquer having a solution viscosity of 3.0 poise.

Coating lacquer B was prepared by adding 578 g. (1.30 mole) of -bis(3,4-dicarboxyphenyl)hexafluoropropane dianhydride to a solution of 266 g. (1.33 mole) of 4,4'-diaminodiphenyl ether in 4,040 g. of DMAC in the manner described above. The resulting polyamide-acid had an inherent viscosity of 0.89 To 933 g. of the above polyamide-acid solution was added 552 g. of DMAC, to give a 12.1 percent solids coating lacquer having a solution viscosity of 3.0 poise.

Coating lacquer C was prepared by adding 476 g. (1.33 mole) of bis(3,4-dicarboxyphenyl) sulfone dianhydride to a solution of 266 g. (1.33 mole) of 4,4'-diaminodiphenyl ether in 4,048 g. of DMAC in the manner employed above. The resulting polyamide-acid had an inherent viscosity of 1.15. To 1,004 g. of the above polyamide-acid solution was added 533.5 'g. of DMAC, to give a 9.6 percent solids coating lacquer having a solution viscosity of 2.9 poise.

A base gel film of polyamide-acid/imide based on pyromellitic dianhydride and 4,4'-diaminodiphenyl ether was prepared as follows:

To a solution of 2,000 g. (10 moles) of 4,4'-diaminodiphenyl ether (DDE) in 23,690 g. of N,N-dimethylacetamide (D-MAC) was added slowly in portions 2,180 g. (10 moles) of pyromellitic dianhydride (PMDA) while maintaining the temperature below 60° C. The resulting 15 percent solids solution of the polyamide-acid was cooled to 0° C., and while maintaining this temperature, 4,080 g. (40 moles) of acetic anhydride and 1,860 g. (20 moles) of betapicoline were mixed into the solution; this composition was cast onto a drum heated at 100° C. in a thickness of about 15 mils, and held there for about 10 seconds, after which it was stripped from the drum as a self-supporting gel polyamide-acid/imide film.

Samples of the above gel film were coated on one side with a coating of each of coating lacquers A, B or C, by contacting one side of the film with a kiss-coating roller which dipped into a bath of the coating lacquer. The amount of lacquer was metered by then passing the film in contact with a ½-inch steel rod wound with 8-mil wire. The film as impaled on a pin tenter frame and then passed through an oven to dry and imidize the laminar film structure. The film speed and oven temperature were 10 in./min. and 140° C. for coating lacquer A, 12 in./min. and 160° C. for coating lacquer B, and 12 in./min. and 117° C. for coating lacquer C. The coating thicknesses were 0.17 mil for coating A, 0.18 mil for coating B, and 0.15 mil for coating C. The coated films had the structure of FIG. 1. The coated films were slit into tapes one-fourth inch wide.

Samples of No. 20 American Wire Gauge silver-coated copper wire were wrapped, with about 50 percent overlap, with one each of tapes A, B or C, in all cases with the coated side of the tape in contact with the silver. Although the insulation would ordinarily have been heat-sealed, for the purpose of this example the insulation was not heat-sealed so that it could be more readily removed from the wire by unwrapping in order to assess its condition after various periods of aging. A fourth wire (coded D), the same No. 20 conductor wrapped with a tape of 1-mil polyimide of pyromellitic dianhydride and 4,4'b -diaminodiphenyl either having on one side a 0.5 mil layer of fluoroethylenepropylene copolymer, wound with the polyimide side in contact with the silver, was tested at the same time; again, this insulation was not heat sealed, for the same reason.

Specimens of wires A, B, C and D were tested by aging in an oven containing air at 250° C. After 16 days of aging, there were deep impressions etched into the inner surface of the insulation of wires A, B and D which were easily visible, and slight pulling on the insulation of these wires caused the insulation to shred. There was no detectable change in the insulation of wire C. After 25 days of aging, the insulation of wires A, B and D all tore upon removing it from the wire, and those portions of the tape which were in direct contact with the silver had holes, visible by 10X magnification, through the tape. There was no visible decomposition or degradation, and no holes were found in the insulation of wire C, and the insulation could not be easily torn. Similar aging tests in air at 200° C. showed the same type of qualitative differences, but to a lesser degree in the same time periods, as would be expected.

After 287 days of aging at 250° C. in air, that portion of the polyimide layer of the insulation of wires A and D which had been in direct contact with the silver surface of the wire had completely disappeared. In wire A, the remaining insulation contained many holes. In wire B, about three-fourths of that portion of the polyimide layer which had been in direct contact with the silver surface of the wire had completely disappeared, and the remaining one-fourth contained many holes. In sharp contrast, while the insulation of wire C which was in direct contact with the silver surface of the wire appeared to be slightly more brittle and more easily torn than the outer layer of the same insulation, the insulation of this wire remained intact and contained no holes.

After 287 days of aging at 200° C. in air, the insulation of wires A, B and D all were embrittled and all contained holes. In contrast, the insulation of wire C showed no evidence of degradation, there was no embrittlement and there were no holes.

EXAMPLE 2

A 15 percent solids coating lacquer was prepared as follows. To a stirred solution of 200 g. (1.00 mole) of 4,4'-diaminodiphenyl ether in 3,162 ml. of DMAC was slowly added 351 g. (0.98 mole) of bis(3,4-dicarboxyphenyl) sulfone dianhydride, under nitrogen. The inherent viscosity of the resulting polyamide-acid was 0.61. A duplicate preparation had an inherent viscosity of 0.63. The two batches were combined.

Polyimide film based on pyromellitic dianhydride and 4,4'-diaminodiphenyl ether, 2 mils thick, was coated on both sides with the above lacquer. The film was passed through a bath of the coating lacquer at 20 ft./min., passed between doctor rolls set with a 4-mil gap, contacted by smoothing rolls, and passed through ovens set at 150° C. and 240° C. to dry and imidize the coating.

Three additional coating runs were made, and the concentration of the polyamide-acid coating lacquer was cut in half for each successive run by dilution with more DMAC. Thus, the solids contents of the lacquers for these three runs were 7.5 percent, 3.75 percent and 1.8 percent.

By comparing the infrared spectra (15 micron absorption band) of the four coated films against a calibration curve prepared from measurements on films of the coating polymer of known thickness, the thickness of the coating of each of the coated films was estimated. The total coating thickness for both sides of films A, B, C and D was estimated as 0.07 mil, 0.05 mil, 0.02 mil and 0.0025 mil, or 0.035 mil, 0.025 mil, 0.01 mil and 0.0012 mil per side. These films had the structure of FIG. 2.

To each of the above coated films was laminated a 0.5 mil film of tetrafluoroethylene/hexafluoropropylene copolymer which had been treated on both sides with an electric discharge in the presence of acetone vapor in accordance with the process described in U.S. application Ser. No. 858, 494, filed 9/16/69. These films had the structure of FIG. 4. All four laminated films were slit into tapes 9/32-in. wide.

No. 20 AWG (American Wire Gauge) silver-coated copper wire was wrapped with one of the above tapes A, B, C or D with an overlap slightly over 50 percent, in all cases with the exposed sulfur-containing polyimide side of the tape in contact with the silver. A fifth silver-coated copper wire of the same type, (coded E) for purposes of comparative testing, was wrapped with a 9/32-in. wide tape of 1-mil polyimide of pyromellitic dianhydride and 4, 4'-diaminodiphenyl ether having on one side a 0.5-mil layer of tetrafluoroethylene/hexafluoropropylene copolymer, wound with the polyimide side in contact with the silver. Each of the five wrapped wires was then overwrapped with a contralapped 5/16-in. wide tape of 1 mil polyimide of pyromellitic dianhydride and 4, 4'-diaminodiphenyl ether having on each side a 0.1 mil layer of tetrafluoroethylene/hexafluoropropylene copolymer. The wrapped wires were then passed at 8 ft./min. through ovens at 370° C. and 425° C. to heat seal the insulation.

Specimens of insulated wire constructions A, B, C, D and E were tested by aging in air at 300° C., 250° C., and 200° C. After various lengths of time, samples of each wire were removed from the aging oven, and the insulation was removed from the wire and examined with a low-power microscope. The results are summarized in tables 1, 2 and 3 below. It is apparent that the presence of the sulfur-bearing polyimide layer between the base polyimide layer and silver wire has greatly retarded or eliminated degradation of the base polyimide layer.

TABLE 1

Condition of polyimide layer next to silver wire after 300° C. aging*

| Days aged | Wire A | Wire B | Wire C | Wire D | Wire E |
|---|---|---|---|---|---|
| 6 | OK | OK | OK | OK | 1 MSH. |
| 8 | OK | OK | OK | OK | Polyimide gone. |
| 12 | OK | OK | OK | OK | Do. |
| 15 | OK | OK | OK | OK | Do. |
| 18 | OK | OK | OK | OK | Do. |

*MSH indicates the number of MicroScopic Holes in the insulation removed from a 6-inch length of wire.

TABLE 2

Condition of polyimide layer next to silver wire after 250° C. aging *

| Days aged | Wire A | Wire B | Wire C | Wire D | Wire E |
|---|---|---|---|---|---|
| 19 | OK | OK | Some MSH | Some MSH | Much deg. |
| 22 | OK | OK | 2 MSH | Many MSH | Do. |
| 25 | OK | OK | 7 MSH | Much deg. | Polyimide gone. |
| 29 | OK | OK | Much deg | do | Do. |
| 32 | OK | OK | do | do | Do. |
| 36 | OK | OK | do | do | Do. |
| 40 | OK | OK | do | do | |
| 50 | OK | OK | Mostly deg | Mostly deg | |
| 56 | OK | 2 MSH | do | do | |
| 67 | OK | Some MSH | do | do | |
| 74 | OK | Some deg | do | do | |

* MSH indicates the number of MicroScopic Hole in the insulation removed from a 6-inch length of wire; deg. indicates degradation.

TABLE 3

CONDITION OF POLYIMIDE LAYER NEXT TO SILVER WIRE AFTER 200° C. AGING*

| Days Aged | Wire A | Wire B | Wire C | Wire D | Wire E |
|---|---|---|---|---|---|
| 40 | OK | OK | OK | OK | |
| 50 | | | | | OK |
| 77 | OK | OK | OK | OK | |
| 83 | OK | OK | OK | OK | some MSH |

*MSH indicates the number of microscopic holes in the insulation removed from a 6-inch length of wire.

EXAMPLE 3

A 15 percent solids coating lacquer was prepared as follows. To a stirred solution of 200 g. (1.00 mole) of 4,4'-diaminodiphenyl ether in 3,160 ml. of DMAC was slowly added with stirring 358 g. (1.00 mole) of bis(3,4-dicarboxyphenyl) sulfone dianhydride, under nitrogen. Stirring was continued for an hour after the final dianhydride addition.

Base film of the polyimide of pyromellitic dianhydride and 4,4'-diaminodiphenyl ether, 1 mil thick, was coated on both sides with this lacquer at 20 ft./min. by dipping in a bath of it, passing the film between doctor rolls set with a gap of 3 mils, contacting with smoothing rolls, and passing through ovens set at 160° C. and 245° C. to dry and imidize the coating. The coating thickness was estimated (infrared technique described above) to be 0.14 mil, or 0.07 mil per side.

Base film of the same composition, 2 mils thick, was similarly coated, using a doctor roll opening of 4 mils. The coating thickness was estimated to be 0.16 mil, or 0.08 mil per side. This product and that of the preceding paragraph had the structure of FIG. 2.

To each of the above coated films was laminated a 0.5 mil film of tetrafluoroethylene/hexafluoropropylene copolymer which had been treated on both sides with an electrical discharge in the presence of acetone vapor in accordance with the procedure described in U.S. application Ser. No. 858,494, filed 9/16/69. The lamination was carried out at 50 ft./min. and a laminator drum temperature of 260°0 C. These films had the structure of FIG. 4. These structures were coded A (1 mil polyimide base) and B (2 mil polyimide base).

Further, to each of the above coated films were laminated two 0.5 mil fluorocarbon polymer films similar to those described in the preceding paragraph except that they were electric discharge treated on one side only; one was laminated to each side of the coated film, with the treated side contacting the coated film. The lamination was carried out at 40 ft./min. and a laminator drum temperature of 260°0 C. These films had the structure of FIG. 6.

Laminar structure A of this example was slit into ¼-in. wide tape. No. 20 AWG silver-coated copper wire was wrapped with this tape with an overlap slightly over 50 percent with the exposed sulfur-containing polyimide side of the tape in contact with the silver. This was then overwrapped with a contralapped 9/32-in. wide tape of 1-mil polyimide of pyromellitic dianhydride and 4,4'-diaminodiphenyl ether having on each side a 0.1 mil layer of tetrafluoroethylene/hexafluoropropylene copolymer. The wrapped wire was heat sealed as in example 2. The product was designated wire A.

Laminar structure B of this example was slit into 3/32-in. wide tape. An insulated wire construction similar to that of the previous paragraph was made, except the second tape was 5/16-in. wide. The product was designated wire B.

Two insulated control wires were prepared for comparison. The first control was like the control wire (wire E) of example 2, and is called here wire C. The second control was similar, except that the first wrap had a 2-mil polyimide base layer and was 9/32-in. wide and the second wrap was 5/16-in. wide, and was called wire D.

Specimens of wires A, B, C and D were tested by aging in air at 250° C. The results are given in table 4 below.

TABLE 4

CONDITION OF POLYIMIDE LAYER NEXT TO SILVER WIRE AFTER 250° C. AGING*

| Days Aged | Wire A | Wire B | Wire C | Wire D |
|---|---|---|---|---|
| 18 | OK | OK | Polyimide gone | some MSH |

*MSH indicates the number of microscopic holes in the insulation removed from a 6-inch length of wire.

EXAMPLE 4

A 15 percent solids coating lacquer was prepared as follows. To a stirred solution of 218 g. (1.01 mole) of 4,4'-diaminodiphenyl sulfide in 3,046 ml. of DMAC was added 214 g. (0.98 mole) of pyromellitic dianhydride, over a period of 10 minutes, under nitrogen. Stirring was continued for an hour after all the dianhydride was added.

Base polyimide films of the type described in example 3, both 1 and 2 mils thick, were coated on both sides with the above lacquer, using the procedure of example 3. These films had the structure of FIG. 2.

Figures 3, 4:
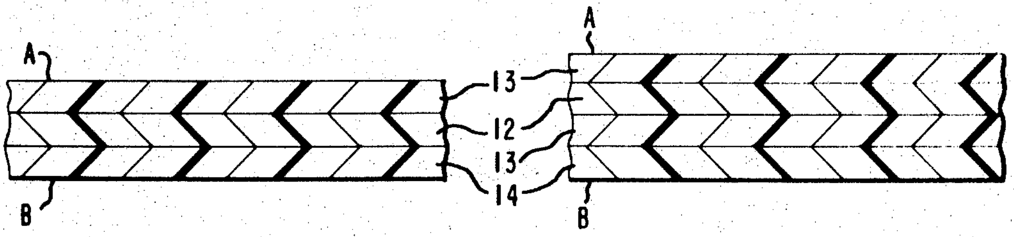
FIG. 4 is a schematic view showing an insulation covering of four layers.
Figures 5, 6:
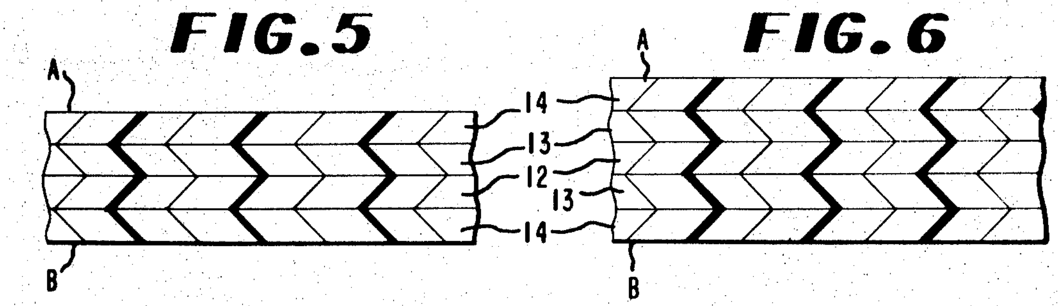
FIGS. 5 and 6 are schematic views showing insulation coverings of four and five layers, respectively.

Each of the above coated films was laminated to a 0.5 mil fluorocarbon polymer film, as described in example 3, to give films having the structure of FIG. 4. The structures were coded A (1 mil polyimide base) and B (2 mil polyimide base).

Laminar structure A of this example was slit into tape ¼-inch wide, and an insulated wire construction as described in example 3 was made. The product was designated wire A.

Laminar structure B of this example was slit into tape 9/32-inch wide, and an insulated wire construction as described in example 3 was made. The product was designated wire B.

Specimens of wires A and B were tested by aging in air at 250° C. and compared against the control wires of example 3. The results are given in table 5 below. Again, it is apparent that the laminar structures which have a layer of sulfur-bearing polyimide disposed toward the silver conductor perform in a far superior way, without degrading in contact with silver conductors for extended periods at high temperature.

TABLE 5

CONDITION OF POLYIMIDE LAYER NEXT TO SILVER WIRE AFTER 250° C. AGING

| Days Aged | Wire A | Wire B |
|---|---|---|
| 18 | OK | OK |

What is claimed is:

1. An article of manufacture comprising an insulated electrical conductor comprising a conductor of silver and an insulation covering thereon of a layer of polyimide polymeric material and a layer of a sulfur-containing polyimide polymeric material adhered to one surface of said polyimide polymeric material and disposed intermediate said conductor and said polyimide layer.

2. The article of claim 1 wherein said insulation covering consists of one layer of said polyimide polymeric material and one layer of said sulfur-containing polyimide polymeric material adhered to each surface of said polyimide polymeric material.

3. The article of claim 2 having a layer of fluorocarbon polymeric material adhered to the surface of one of said layers of sulfur-containing polyimide polymeric material.

4. The article of claim 3 having a layer of fluorocarbon polymeric material adhered to the surface of the other of said sulfur-containing polyimide polymeric material.

5. The article of claim 1 having a layer of fluorocarbon polymeric material adhered to the surface of said polyimide polymeric material.

6. The article of claim 5 having a layer of fluorocarbon polymeric material adhered to the exposed surface of said sulfur-containing polyimide polymeric material.

7. The article of claim 1 wherein said sulfur-containing polyimide layer is at least about 0.001 mil thick.

* * * * *

PO-1050
(5/69)

UNITED STATES PATENT OFFICE
CERTIFICATE OF CORRECTION

Patent No. 3,617,617 Dated November 2, 1971

Inventor(s) Morton Katz

It is certified that error appears in the above-identified patent and that said Letters Patent are hereby corrected as shown below:

Column 2, line 53, " $\overset{R^4}{\overset{|}{\underset{\underset{P}{\|}}{-P-}}}$ " should read -- $\overset{R^4}{\overset{|}{\underset{\underset{O}{\|}}{-P-}}}$ --;

Column 3, line 19, "2,2"-diphenyltetracarboxylic" should read -- 2,2',3,3'-diphenyltetracarboxylic --;

Column 3, line 54, "phenanthrene-9c 1,8,9,10-tetracarboxylic" should read -- phenanthrene-1,8,9,10-tetracarboxylic--;

Column 6, line 70, "sides" should be deleted and -- and -- inserted in its stead;

Column 8, line 24, -- 2,2 -- should be inserted before "-bis";

Column 8, line 28, "933 g." should read -- 993 g. --;

Column 8, line 60, "as" should read -- was --;

Column 9, line 4, "4,4'b-diaminodiphenyl either" should read -- 4,4'-diaminodiphenyl ether --;

Column 11, line 67, "3/32-in." should read -- 9/32-in. --.

Signed and sealed this 9th day of January 1973.

(SEAL)
Attest:

EDWARD M.FLETCHER,JR.
Attesting Officer

ROBERT GOTTSCHALK
Commissioner of Patents